US012203633B1

(12) United States Patent
Fan et al.

(10) Patent No.: US 12,203,633 B1
(45) Date of Patent: Jan. 21, 2025

(54) QUICKLY-SPLICEABLE LINEAR LAMP

(71) Applicant: Signcomplex Limited, Shenzhen (CN)

(72) Inventors: Shuxing Fan, Shenzhen (CN); Meiming Zhou, Ji'an (CN); Tiejun Wu, Shenzhen (CN)

(73) Assignee: Signcomplex Limited, Shenzhen (CN)

( * ) Notice: Subject to any disclaimer, the term of this patent is extended or adjusted under 35 U.S.C. 154(b) by 0 days.

(21) Appl. No.: 18/598,509

(22) Filed: Mar. 7, 2024

(30) Foreign Application Priority Data

Nov. 30, 2023 (CN) ......................... 202323270900.1

(51) Int. Cl.
*F21V 21/005* (2006.01)
*F21V 21/096* (2006.01)

(52) U.S. Cl.
CPC .......... *F21V 21/096* (2013.01); *F21V 21/005* (2013.01)

(58) Field of Classification Search
CPC ... H01R 13/62916; F21V 19/04; F21V 17/18; F21V 21/005; F21V 21/025; F21V 21/34; F21V 21/35; F21V 15/015; F21S 4/28
See application file for complete search history.

(56) References Cited

U.S. PATENT DOCUMENTS 11,454,381 B1 * 9/2022 Prosch .................. F21V 21/005
2013/0122724 A1 * 5/2013 Velazquez ............... F21V 23/06 439/39
2016/0116143 A1 * 4/2016 Li ............................. F21S 4/20 362/382
2018/0334804 A1 * 11/2018 Patterson .............. F21V 21/008
2022/0120392 A1 * 4/2022 Wang ....................... F21K 9/275
2022/0373146 A1 * 11/2022 Li ......................... F21V 21/005

FOREIGN PATENT DOCUMENTS

WO WO-2023032512 A1 * 3/2023

OTHER PUBLICATIONS

Machine Translation of WO 2023032512A1, retrieved from worldwide.espacenet.com on May 6, 2024 (Year: 2024).*

* cited by examiner

*Primary Examiner* — Abdulmajeed Aziz
*Assistant Examiner* — Steven Y Horikoshi

(57) ABSTRACT

The present application provides a quickly-spliceable linear lamp, comprising: a lamp body; two magnetic modules respectively arranged at two ends of the lamp body in a length direction thereof; When two quickly-spliceable linear lamps are spliced together, two magnetic modules between two adjacent ends of the two quickly-spliceable linear lamps magnetically cooperate with each other to connect the two quickly-spliceable linear lamps together. wherein the magnetic module comprises a connecting frame and a magnet, wherein the connecting frame is provided with a first connecting arm and a second connecting arm which are connected to each other, the first connecting arm is arranged in the lamp body and is connected to the lamp body, the second connecting arm is located on an end portion of the lamp body, and the magnet is arranged on the second connecting arm.

9 Claims, 12 Drawing Sheets

QUICKLY-SPLICEABLE LINEAR LAMP

TECHNICAL FIELD

The present application relates to a linear lamp, and in particular, to a quickly-spliceable linear lamp.

BACKGROUND ART

A linear lamp is a high-end flexible decorative lamp, which has the characteristics of low energy consumption, long life, high brightness, ease of bending, maintenance-free, etc. The linear lamp is especially suitable for indoor entertainment places, building outline drawing, billboard manufacturing, etc.

At present, some linear lamps in the market are of a spliceable structure. That is, connecting structures are provided at two ends of each linear lamp, so that two adjacent linear lamps arranged in length directions of the linear lamps are spliced together by means of connecting structures. However, since the connecting structures used in the linear lamps in the prior art are connecting plates, the connecting plates are inserted between two adjacent end portions of the two linear lamps, and are then fixed to the linear lamps by means of screws, resulting in a troublesome splicing operation and low splicing efficiency.

SUMMARY

An embodiment of the present application provides a quickly-spliceable linear lamp, in order to solve the problems existing in the related art. A technical solution thereof is described as follows.

An embodiment of the present application provides a quickly-spliceable linear lamp, comprising:

a lamp body;

two magnetic modules respectively arranged at two ends of the lamp body in a length direction thereof; and two positioning structures respectively arranged at the two ends of the lamp body in the length direction thereof, wherein when two quickly-spliceable linear lamps are spliced together, two magnetic modules between two adjacent ends of the two quickly-spliceable linear lamps magnetically cooperate with each other to connect the two quickly-spliceable linear lamps together, and two positioning structures between the two adjacent ends of the two quickly-spliceable linear lamps are connected together under the driving of magnetic attraction forces of the magnetic modules, such that the two adjacent ends of the two quickly-spliceable linear lamps are aligned with each other.

In an implementation, one of the magnetic modules has an S-pole magnet, and the other of the magnetic modules has an N-pole magnet.

In an implementation, the magnetic module comprises a connecting frame and a magnet, wherein the connecting frame is provided with a first connecting arm and a second connecting arm which are connected to each other, the first connecting arm is arranged in the lamp body and is connected to the lamp body, the second connecting arm is located on an end portion of the lamp body, and the magnet is arranged on the second connecting arm.

In an implementation, in each magnetic module, there are at least two magnets arranged spaced apart from each other.

In an implementation, the positioning structure comprises a positioning groove and a positioning block, wherein the positioning groove and the positioning block are respectively arranged on two sides of the lamp body in a width direction thereof; and when the two quickly-spliceable linear lamps are spliced together, the positioning grooves and the positioning blocks located on the different quickly-spliceable linear lamps cooperate with each other.

In an implementation, the positioning block and the connecting frame are integrally formed, the positioning block is located on a first side of the connecting frame in a width direction thereof, and a second side of the connecting frame in the width direction thereof and an inner wall of the lamp body enclose the positioning groove.

In an implementation, the positioning structure comprises a positioning groove and a positioning block, wherein the positioning groove and the positioning block are respectively arranged on two sides of the lamp body in a width direction thereof; and when the two quickly-spliceable linear lamps are spliced together, the positioning grooves and the positioning blocks located on the different quickly-spliceable linear lamps cooperate with each other.

In an implementation, the quickly-spliceable linear lamp further comprises a connecting member, wherein two first snap-fit structures are provided on the connecting member, and the two first snap-fit structures are sequentially arranged in a length direction of the connecting member;

side walls of the two ends of the lamp body each are provided with a second snap-fit structure; and when the two quickly-spliceable linear lamps are spliced together, one of the first snap-fit structures is snap-fitted with the second snap-fit structure on one of the quickly-spliceable linear lamps, and the other first snap-fit structure is snap-fitted with the second snap-fit structure on the other quickly-spliceable linear lamp, so as to limit separation of the two adjacent magnetic modules from each other.

The quickly-spliceable linear lamp further comprises two end caps, wherein the two end caps are respectively removably arranged at the two ends of the lamp body to close end portions of the lamp body.

In an implementation, the lamp body comprises:

a housing body;

a first light source having an engaging groove; and a connector comprising a connecting base, a press-type driving structure, and an engaging member, wherein the connecting base is connected to the housing body, the press-type driving structure is movably arranged on the connecting base, the engaging member is connected to the press-type driving structure, and the engaging member has a connected state in which the engaging member is connected to the engaging groove and an unlocked state in which the engaging member is disconnected from the engaging groove;

the first light source and the housing body are connected together when the engaging member is connected to the engaging groove, or the first light source is disconnected from the housing body when the engaging member is disconnected from the engaging groove; and the press-type driving structure can be pressed to move so as to drive the engaging member to rotate, and the engaging member rotates to switch between the connected state and the unlocked state.

The above technical solution has at least the following advantages and beneficial effects.

In the quickly-spliceable linear lamp according to the present application, since the magnetic modules are provided, the magnetic cooperation between two magnetic modules between the two adjacent ends of the two spliced linear lamps can be used to quickly splice the two linear lamps together, thereby achieving simple operations and high splicing efficiency. In addition, since the positioning structures are provided, two positioning structures between the two adjacent ends of the two linear lamps can be connected under the driving of magnetic attraction forces during magnetic cooperation between the two magnetic modules, so that the two adjacent ends of the two linear lamps can be aligned with each other, to avoid an offset between the two adjacent linear lamps, thereby preventing light leakage and improving a lighting effect after splicing.

The above description is merely presented for the purpose of illustration, and is not intended to limit the present application in any way. Except for the above illustrative aspects, implementations and features, further aspects, implementations and features of the present application will become readily apparent with reference to the accompanying drawings and the following detailed description.

BRIEF DESCRIPTION OF THE DRAWINGS

In the accompanying drawings, the same reference signs denote the same or similar components or elements throughout a plurality of accompanying drawings unless otherwise specified. These accompanying drawings are not necessarily drawn to scale. It should be understood that these accompanying drawings depict only some implementations according to the present application and are not to be construed as limiting the scope of the present application.

LIST OF REFERENCE SIGNS

Figure 1:
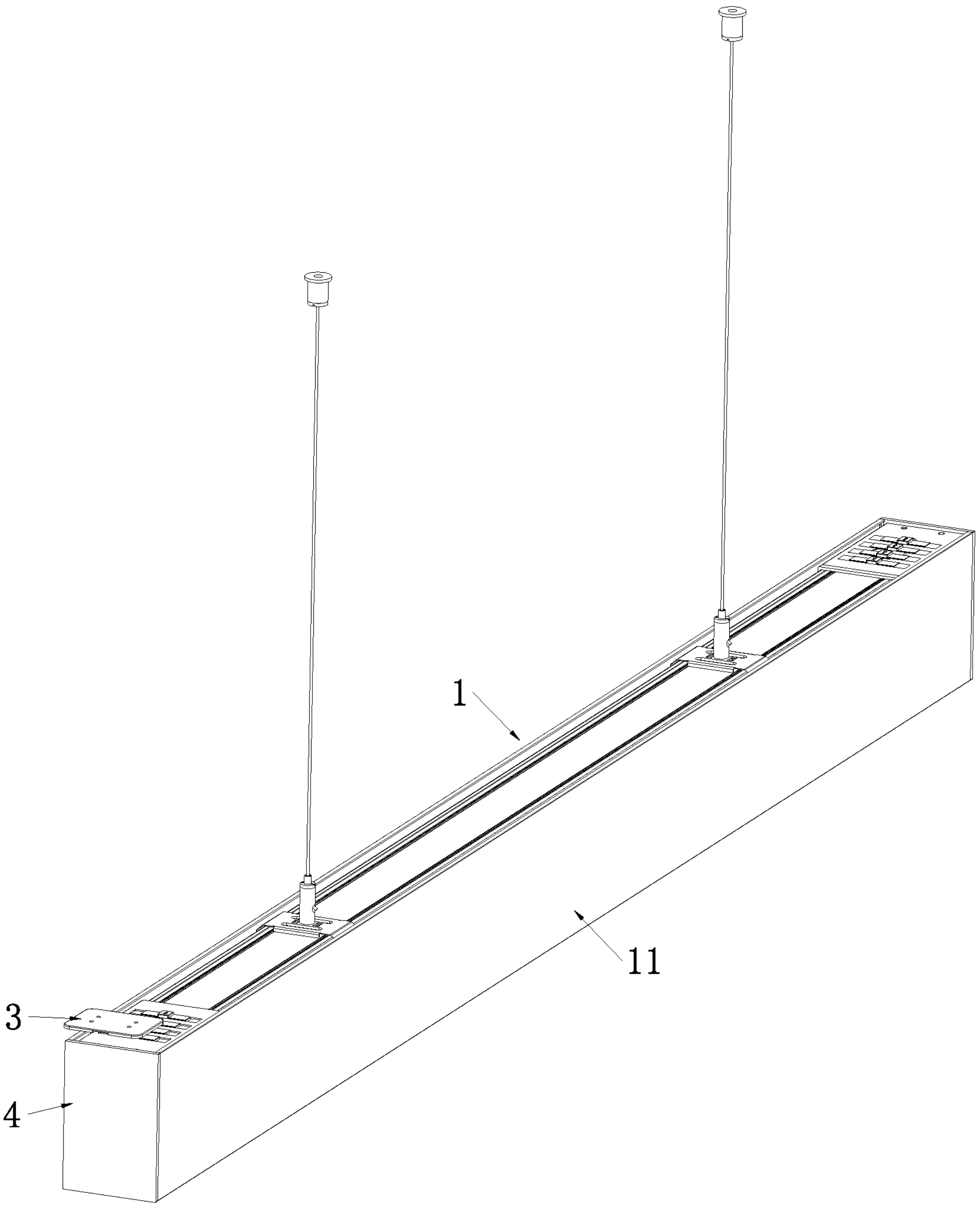
FIG. 1 is a schematic perspective structural diagram of a quickly-spliceable linear lamp according to the present application.
Figure 2:
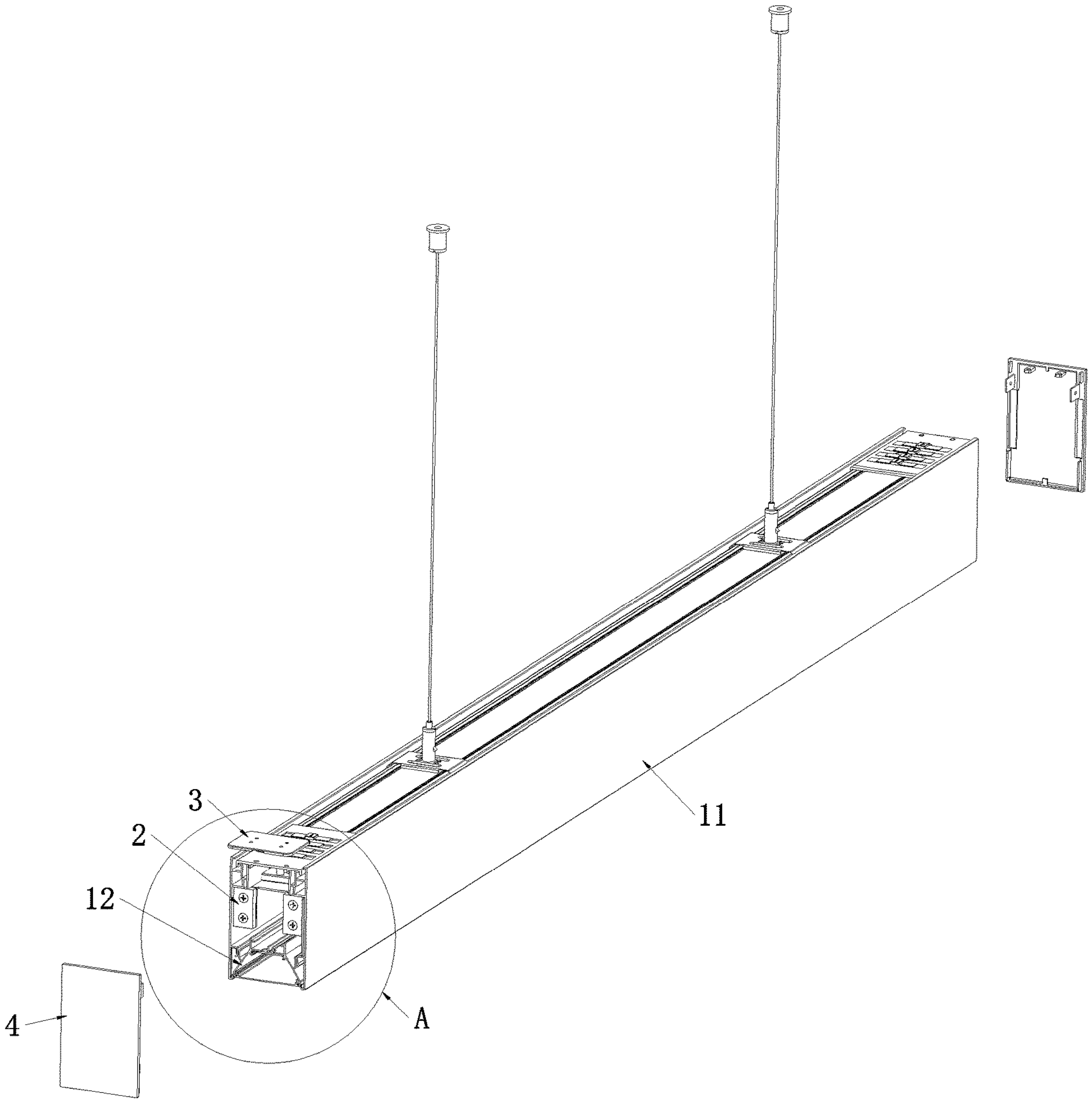
FIG. 2 is an exploded view of a quickly-spliceable linear lamp according to the present application.

1. Lamp body; 11. Housing body; 111. Positioning groove; 112. Second snap-fit structure; 113. Accommodating groove; 12. First light source; 121. Engaging groove; 13. Connector; 131. Connecting base; 1311. Connecting seat; 13111. Locking groove; 13112. Connecting hole; 13113. First beveled portion; 13114. Third snap-fit structure; 1312. Limiting cover; 132. Press-type driving structure; 1321. Push cylinder; 13211. Second beveled portion; 13212. Guide block; 13213. First avoidance groove; 1322. Rotating seat; 13221. Locking block; 13222. Third beveled portion; 13223. Second avoidance groove; 1323. Elastic member; 133. Engaging member; 134. Pressing member; 135. Fastener; 14. Second light source; 15. Power source; 2. Magnetic module; 21. Magnet; 22. Connecting frame; 221. First connecting arm; 222. Second connecting arm; 223. Positioning block; 3. Connecting member; 31. First snap-fit structure; 4. End cap.

DETAILED DESCRIPTION OF EMBODIMENTS

Only some exemplary embodiments are briefly described below. As can be appreciated by those skilled in the art, modifications may be made to the described embodiments in various ways without departing from the spirit or scope of the present application. Therefore, the accompanying drawings and the description are considered as exemplary in nature rather than limiting.

FIGS. 1-12 illustrate a quickly-spliceable linear lamp according to a preferred implementation of the present application, comprising: a lamp body 1, two magnetic modules 2, and two positioning structures. The two magnetic modules 2 are respectively arranged at two ends of the lamp body 1 in a length direction thereof, that is, one of the magnetic modules 2 is arranged at one end of the lamp body 1 in the length direction thereof, and the other of the magnetic modules 2 is arranged at the other end of the lamp body 1 in the length direction thereof. The two positioning structures are respectively arranged at the two ends of the lamp body 1 in the length direction thereof, that is, one of the positioning structures is arranged at one end of the lamp body 1 in the length direction thereof, and the other positioning structure is arranged at the other end of the lamp body 1 in the length direction thereof.

When two quickly-spliceable linear lamps are spliced together, two magnetic modules 2 between two adjacent ends of the two quickly-spliceable linear lamps magnetically cooperate with each other to connect the two quickly-spliceable linear lamps together, and two positioning structures between the two adjacent ends of the two quickly-spliceable linear lamps are connected together under the driving of magnetic attraction forces of the magnetic modules 2, such that the two adjacent ends of the two quickly-spliceable linear lamps are aligned with each other.

In the quickly-spliceable linear lamp according to the present application, since the magnetic modules 2 are provided, the magnetic cooperation between two magnetic modules 2 between the two adjacent ends of the two spliced linear lamps can be used to quickly splice the two linear lamps together, thereby achieving simple operations and high splicing efficiency. In addition, since the positioning structures are provided, two positioning structures between the two adjacent ends of the two linear lamps can be connected under the driving of magnetic attraction forces during magnetic cooperation between the two magnetic modules 2, so that the two adjacent ends of the two linear lamps can be aligned with each other, to avoid an offset between the two adjacent linear lamps, thereby preventing light leakage and improving a lighting effect after splicing.

In an implementation, one of the magnetic modules 2 has an S-pole magnet, and the other of the magnetic modules 2 has an N-pole magnet. In this way, when the two adjacent linear lamps are spliced, the magnetic modules 2 with the same polarity can cooperate with each other to facilitate quick splicing of the linear lamps together in a set orientation and avoid reverse mounting, so that the splicing efficiency can be further improved.

Of course, in other implementations, the magnets 21 of the two magnetic modules 2 have the same polarity.

Figure 5:
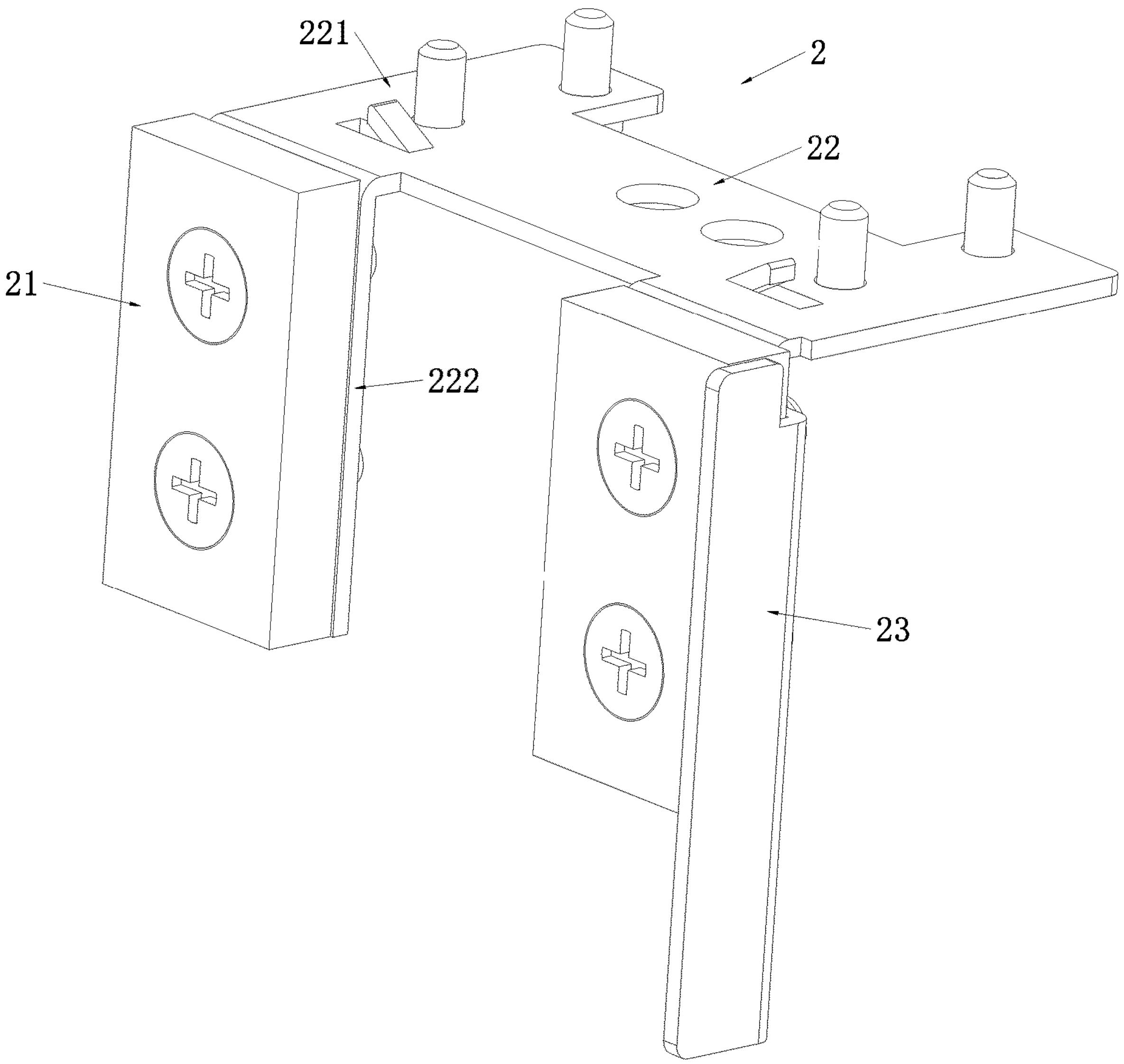
FIG. 5 is a schematic structural diagram of a magnetic module according to the present application.

Referring to FIG. 5, in an implementation, the magnetic module 2 comprises a connecting frame 22 and a magnet 21. The connecting frame 22 is provided with a first connecting arm 221 and a second connecting arm 222 which are connected to each other. The first connecting arm 221 extends in the length direction of the lamp body 1. The first connecting arm 221 is arranged in the lamp body 1 and is connected to the lamp body 1, so as to fix the connecting frame 22 to the lamp body 1. The second connecting arm 222 is located on an end portion of the lamp body 1, and the magnet 21 is arranged on the second connecting arm 222, such that the magnet 21 is fixed to the connecting frame 22. In this way, during mounting, it is possible to first mount the magnet 21 on the second connecting arm 222 to form a modular magnetic module 2, and then mount the first connecting arm 221 on the lamp body 1 so as to mount the modular magnetic module 2 on the lamp body 1, thereby achieving more convenient mounting and higher mounting efficiency.

In an implementation, in each magnetic module 2, there are at least two magnets 21, and the at least two magnets 21 are arranged spaced apart from each other, so as to increase a connection strength of two adjacent magnetic modules 2, so that the two spliced linear lamps are reliably connected together.

Specifically, in each magnetic module 2, at least two magnets 21 are arranged spaced apart from each other in a width direction of the lamp body 1.

Figure 3:
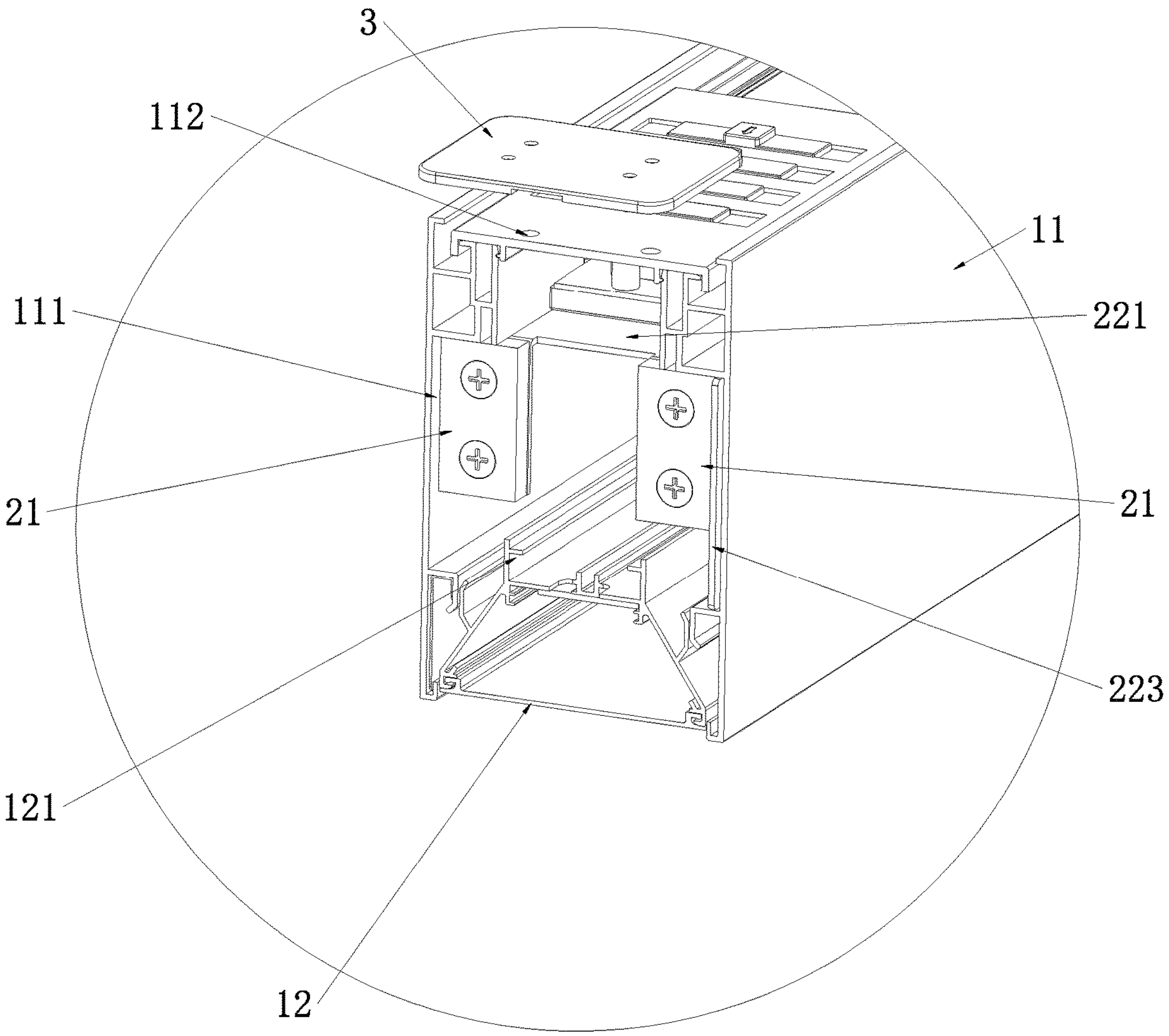
FIG. 3 is a partially enlarged view of part A of FIG. 2.

Referring to FIG. 3, in an implementation, the positioning structure comprises a positioning groove 111 and a positioning block 223. The positioning groove 111 and the positioning block 223 are respectively arranged on two sides of the lamp body 1 in the width direction thereof.

When the two quickly-spliceable linear lamps are spliced together, the positioning grooves 111 and the positioning blocks 223 located on the different quickly-spliceable linear lamps cooperate with each other, such that the two adjacent ends of the two adjacent linear lamps are aligned with each other, to avoid an offset.

Of course, in other implementations, one of the two adjacent positioning structures of the two adjacent linear lamps comprises two positioning grooves 111, the other comprises two positioning blocks 223, and the positioning blocks 223 cooperate with the corresponding positioning grooves 111, so that the two adjacent ends of the two adjacent linear lamps can also be aligned with each other, to avoid an offset.

Referring to FIG. 5, in an implementation, the positioning block 223 and the connecting frame 22 are integrally formed, the positioning block 223 is located on a first side of the connecting frame 22 in a width direction thereof, and a second side of the connecting frame 22 in the width direction thereof and an inner wall of the lamp body 1 enclose the positioning groove 111. Since the positioning block 223 and the connecting frame 22 are integrally formed, the positioning block 223 and the connecting frame 22 are free of connection with each other, and the positioning block 223 can be fixed to the lamp body 1 by fixing the connecting frame 22 to the lamp body 1, thereby achieving convenient mounting and high mounting efficiency. In addition, since the positioning groove 111 is enclosed by the connecting frame 22 and the lamp body 1, a step of providing a groove body on the lamp body 1 can be omitted, so that the manufacturing efficiency is high, and the cost is reduced.

Referring to FIGS. 1-4 and 12, in an implementation, the quickly-spliceable linear lamp further comprises a connecting member 3. Two first snap-fit structures 31 are provided on the connecting member 3, and the two first snap-fit structures 31 are sequentially arranged in a length direction of the connecting member 3;

- side walls of the two ends of the lamp body 1 each are provided with a second snap-fit structure 112; and
- when the two quickly-spliceable linear lamps are spliced together, one of the first snap-fit structures 31 is snap-fitted with the second snap-fit structure 112 on one of the quickly-spliceable linear lamps, and the other first snap-fit structure 31 is snap-fitted with the second snap-fit structure 112 on the other quickly-spliceable linear lamp, so as to limit separation of the two adjacent magnetic modules 2 from each other, thereby reliably connecting the two adjacent linear lamps together, and achieving higher connection reliability. The connection between the two adjacent linear lamps is reinforced by means of the snap-fit structures, so that it is possible to achieve convenient disassembly and assembly and high disassembly and assembly efficiency while improving the connection reliability.

Specifically, the first snap-fit structure 31 is an engaging protrusion, the second snap-fit structure 112 is a hole, and the second snap-fit structure 112 of the hole structure does not protrude relative to the lamp body 1, thus avoiding rubbing. Of course, in other implementations, the first snap-fit structure 31 is a hole, and the second snap-fit structure 112 is an engaging protrusion.

Referring to FIGS. 1-4, in an implementation, the quickly-spliceable linear lamp further comprises two end caps 4. The two end caps 4 are respectively removably arranged at the two ends of the lamp body 1 to close end portions of the lamp body 1. With the arrangement of the end caps 4, the end portions of the lamp body 1 can be closed when the linear lamp is not spliced, so that the interior of the lamp body 1 is relatively closed, which can achieve a dustproof effect. In addition, structures located inside the lamp body 1, such as the magnetic modules 2, are prevented from being exposed, so that the linear lamp is simpler and more attractive.

Specifically, the end caps 4 are removably connected to the lamp body 1 by means of snap-fitting, to facilitate the quick dismounting and mounting of the end caps 4 and improve efficiency.

Of course, in other implementations, the end caps 4 may be connected to the lamp body 1 by means of screws, which can likewise improve the reliability of the connection between the end caps 4 and the lamp body 1.

Figure 4:
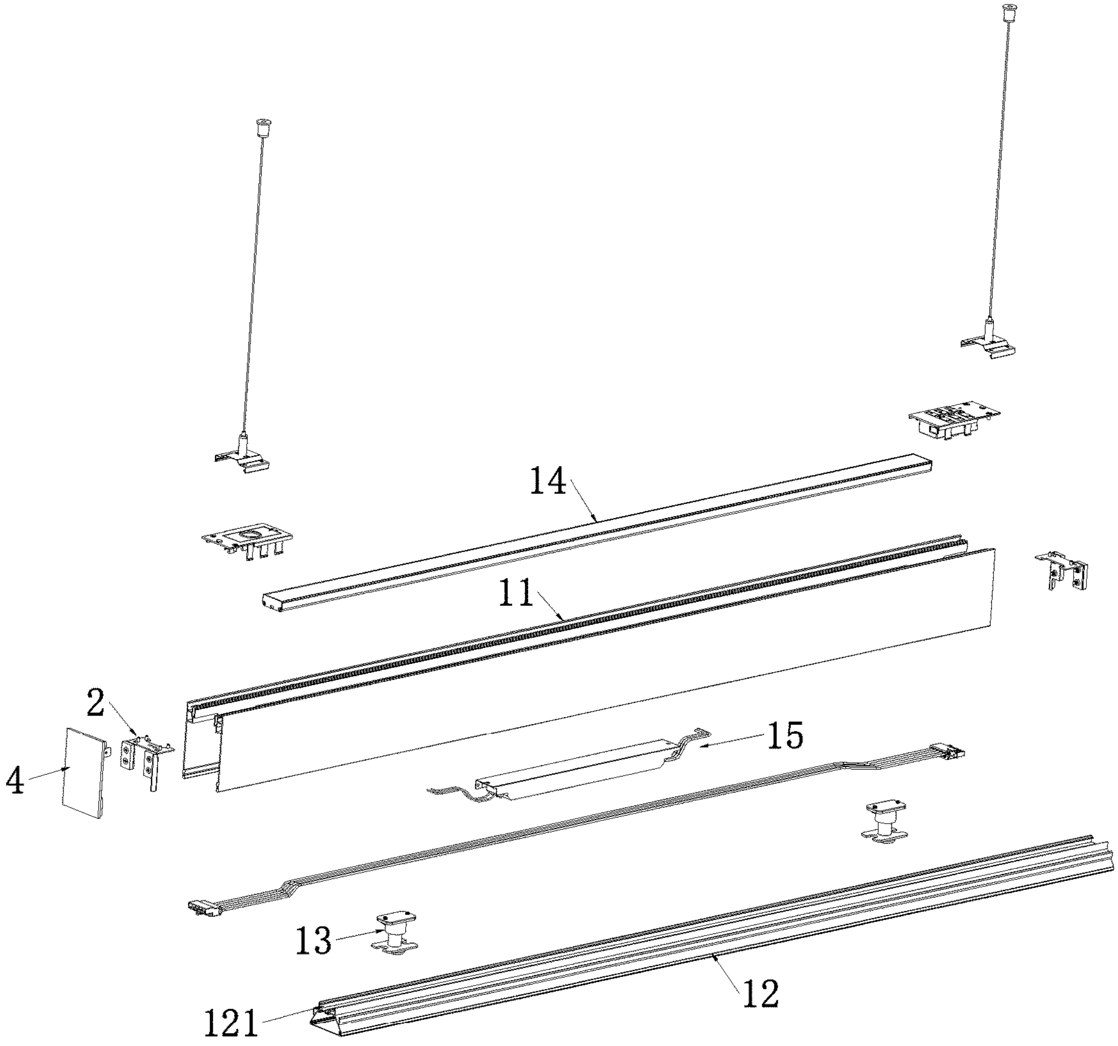
FIG. 4 is an exploded view of a quickly-spliceable linear lamp according to the present application.

Referring to FIG. 4, in an implementation, the lamp body 1 comprises:

- a housing body 11;
- a first light source 12, the first light source 12 having an engaging groove 121; and
- a connector 13. The connector 13 comprises a connecting base 131, a press-type driving structure 132, and an engaging member 133. The connecting base 131 is connected to the housing body 11, the press-type driving structure 132 is movably arranged on the connecting base 131, the engaging member 133 is connected to the press-type driving structure 132, and the engaging member 133 has a connected state in which the engaging member is connected to the engaging groove 121 and an unlocked state in which the engaging member is disconnected from the engaging groove 121.

The first light source 12 and the housing body 11 are connected together when the engaging member 133 is connected to the engaging groove 121, or the first light source 12 is disconnected from the housing body 11 when the engaging member 133 is disconnected from the engaging groove 121.

The press-type driving structure 132 can be pressed to move so as to drive the engaging member 133 to rotate, and the engaging member 133 rotates to switch between the connected state and the unlocked state. In this way, during mounting of the first light source 12, an opening of the engaging groove 121 is aligned with the engaging member 133, and the first light source 12 is pressed in a direction close to the housing body 11, such that the first light source 12 presses the press-type driving structure 132 to drive the engaging member 133 to switch from the unlocked state to the connected state, thereby connecting the first light source 12 and the housing body 11 together. During dismounting, the first light source 12 is pressed in the direction close to the housing body 11, such that the first light source 12 presses the press-type driving structure 132, so as to drive the engaging member 133 to switch from the connected state to the unlocked state, and thus the engaging member 133 is disconnected from the engaging groove 121, thereby dismounting the first light source 12 from the housing body 11. The first light source 12 can be dismounted or mounted by means of a pressing operation, thereby achieving simple operations, convenient dismounting and mounting, and high dismounting and mounting efficiency. The first light source 12 can be quickly replaced, thereby meeting use requirements for replacement with a different first light source 12.

In an implementation, the press-type driving structure 132 is provided with a pressing member 134, and the pressing member 134 can abut against the first light source 12 moving close to the housing body 11, such that the press-type driving structure 132 is driven by the first light source 12 to move. In this way, during mounting and dismounting of the first light source 12, the first light source 12 can abut against the pressing member 134 by pressing the first light source 12 in the direction close to the housing body 11, so as to facilitate the pressing of the press-type driving structure 132, and further drive the press-type driving structure 132 to move.

Figure 6:
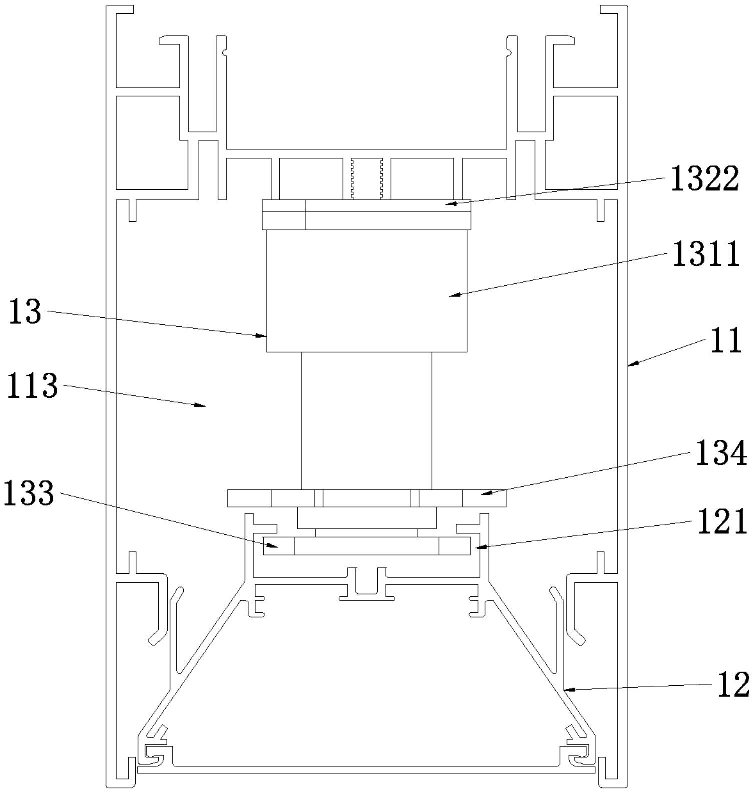
FIG. 6 is a schematic structural diagram of a housing body, a first light source and a connector that are assembled together according to the present application.

Referring to FIG. 6, in an implementation, the pressing member 134 extends in the width direction of the lamp body 1, and two sides of the pressing member 134 in the width direction of the lamp body 1 can abut against the first light source 12, such that the pressing member 134 is uniformly stressed, and thus the press-type driving structure 132 is reliably pressed.

Referring to FIG. 6, in an implementation, the housing body 11 is provided with an accommodating groove 113, and the accommodating groove 113 is configured to accommodate at least part of the first light source 12 and the connector 13. An opening of the accommodating groove 113 is covered by the first light source 12, which can achieve an effect of hiding the connector 13 and a joint between the connector 13 and the first light source 12. In addition, the interior of the housing body 11 can form a relatively closed structure, thus achieving a dustproof effect.

In an implementation, a locking structure is arranged between the connecting base 131 and the press-type driving structure 132, and the locking structure is configured to maintain the connected state or the unlocked state of the engaging member 133, such that the first light source 12 and the housing body 11 can be reliably connected together. In addition, since the engaging member 133 can maintain the unlocked state, after the first light source 12 is dismounted, the engaging member 133 can be aligned with the opening of the engaging groove 121 without operating the press-type driving structure 132 again, and thus the mounting efficiency can be further improved.

Figure 8:
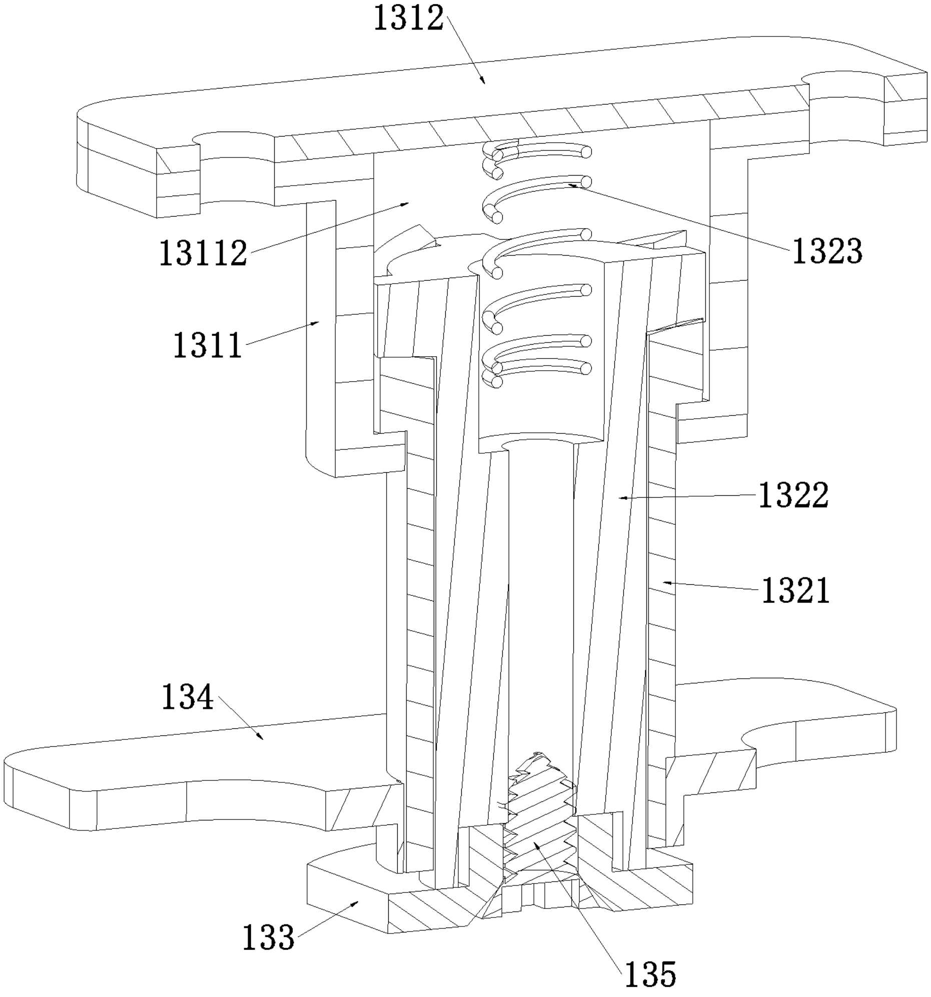
FIG. 8 is a cross-sectional view of the connector shown in FIG. 7.

Referring to FIG. 8, in an implementation, the connecting base 131 has a connecting hole 13112, an end of the press-type driving structure 132 away from the engaging member 133 is movably inserted into the connecting hole 13112, and the locking structure is located between a hole wall of the connecting hole 13112 and the press-type driving structure 132. In this way, the connecting hole 13112 can be used to guide the movement of the press-type driving structure 132, and thus the press-type driving structure 132 can move smoothly.

Figure 9:
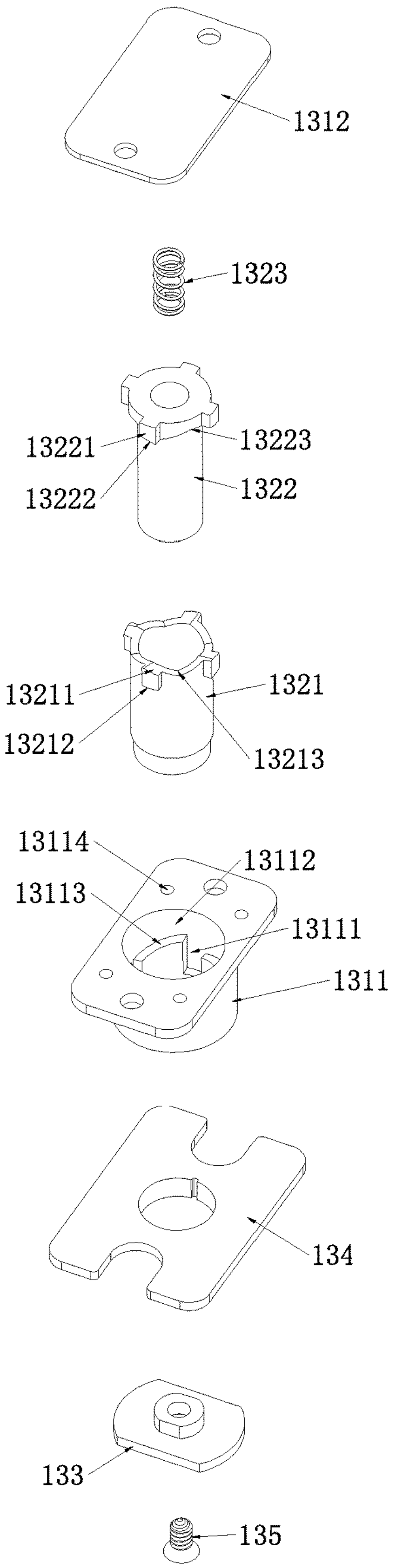
FIG. 9 is an exploded view of the connector shown in FIG. 7.

Referring to FIG. 9, in an implementation, the locking structure comprises: a plurality of locking grooves 13111, and a plurality of locking blocks 13221. The locking grooves 13111 are provided in the hole wall of the connecting hole 13112, and the plurality of locking grooves 13111 are provided spaced apart from each other around a central axis of the connecting hole 13112. The locking blocks 13221 are arranged on the press-type driving structure 132, the plurality of locking blocks 13221 are arranged spaced apart from each other around an axial central line of the press-type driving structure 132, and the locking blocks 13221 are movably arranged in corresponding locking grooves 13111 in a pressing direction of the press-type driving structure 132.

When the engaging member 133 is in the connected state or the unlocked state, the locking blocks 13221 cooperate with the corresponding locking grooves 13111.

During switching of the engaging member 133 between the connected state and the unlocked state, the locking blocks 13221 are disengaged from the locking grooves 13111, such that the engaging member 133 can rotate, and the rotation of the engaging member 133 drives the locking blocks 13221 to rotate. As a result, each locking block 13221 is switched from cooperating with one of two adjacent locking grooves 13111 to cooperating with the other adjacent locking groove 13111, so as to switch the engaging member 133 between the connected state and the unlocked state. The locking structure is simple and practical, is convenient to operate and has a high reliability.

Referring to FIGS. 7-11, in an implementation, a plurality of first beveled portions 13113 are arranged on the hole wall of the connecting hole 13112, and the plurality of first beveled portions 13113 are arranged spaced apart from each other around the central axis of the connecting hole 13112. The first beveled portions 13113 are staggered relative to the locking grooves 13111. An end of each first beveled portion 13113 extends from an opening of one of two adjacent locking grooves 13111 to an opening of the other adjacent locking groove 13111, such that a third beveled portion 13222 can be guided from one of two adjacent locking grooves 13111 to the other adjacent locking groove 13111.

The Press-type driving structure 132 comprises: a push cylinder 1321, a rotating seat 1322, and an elastic member 1323. A first end of the push cylinder 1321 is movably inserted into the connecting hole 13112, a second end of the push cylinder 1321 is exposed out of the connecting hole 13112 and is connected to the pressing member 134, a plurality of second beveled portions 13211 are arranged on a peripheral wall of the first end of the push cylinder 1321, the plurality of second beveled portions 13211 are arranged spaced apart from each other around an axial central line of the push cylinder 1321, and the second beveled portions 13211 are movably arranged in corresponding locking grooves 13111 to guide the movement of the push cylinder 1321. The rotating seat 1322 is movably inserted into a central hole of the push cylinder 1321, a first end of the rotating seat 1322 is exposed, the locking blocks 13221 and a plurality of third beveled portions 13222 are arranged on a peripheral wall of the first end of the rotating seat 1322, the third beveled portions 13222 are arranged on corresponding locking blocks 13221, and a second end of the rotating seat 1322 is exposed and is connected to the engaging member 133. The elastic member 1323 is arranged between the connecting base 131 and the first end of the rotating seat 1322, and the elastic member 1323 is configured to drive the push cylinder 1321 to return.

Figure 10:
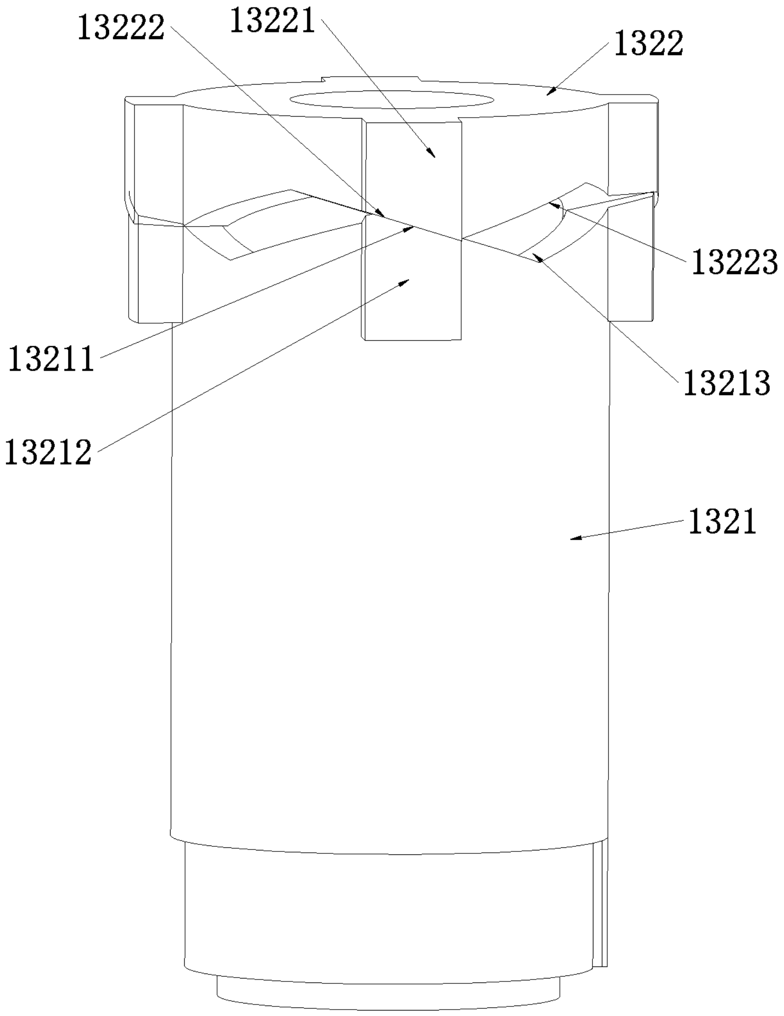
FIG. 10 is a schematic structural diagram of a push cylinder and a rotating seat assembled together in the connector shown in FIG. 7.

Referring to FIG. 10, when the engaging member 133 is in the connected state or the unlocked state, the third beveled portions 13222 and the second beveled portions 13211 cooperate with each other to position the rotating seat 1322, such that when the press-type driving structure 132 is pressed, the push cylinder 1321 can drive the rotating seat 1322 to move. In addition, when the locking blocks 13221 are disengaged from the locking grooves 13111, the rotating seat 1322 can rotate linearly under the combined action of the third beveled portions 13222 and the clastic member 1323, so as to guide the third beveled portions 13222 to cooperate with the first beveled portions 13113.

The second beveled portions 13211 are used to guide the third beveled portions 13222 to cooperate with corresponding first beveled portions 13113 when the locking blocks 13221 are disengaged from the locking grooves 13111.

When the engaging member 133 rotates, the first beveled portions 13113 are used to guide the third beveled portions 13222 cooperating therewith to cooperate with corresponding locking grooves 13111, to lock the locking blocks 13221, so that the engaging member 133 reliably maintains the required connected state or unlocked state. That is, with the arrangement of the first beveled portions 13113, the second beveled portions 13211, the third beveled portions 13222 and the clastic member 1323, the rotating seat 1322 can switch from linear movement to linear rotating motion, so as to switch the engaging member 133 between the connected state and the unlocked state, thereby achieving a simple and practical structure and high reliability.

Figure 11:
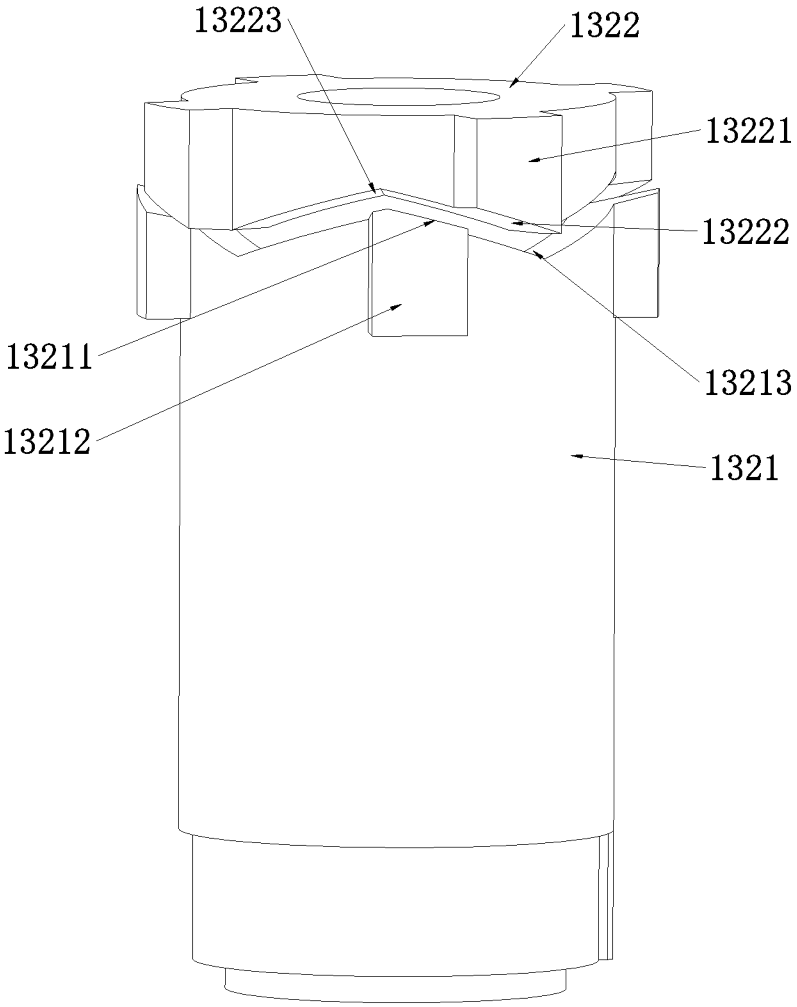
FIG. 11 is a schematic structural diagram of a push cylinder and a rotating seat assembled together in the connector shown in FIG. 7.
Figure 12:
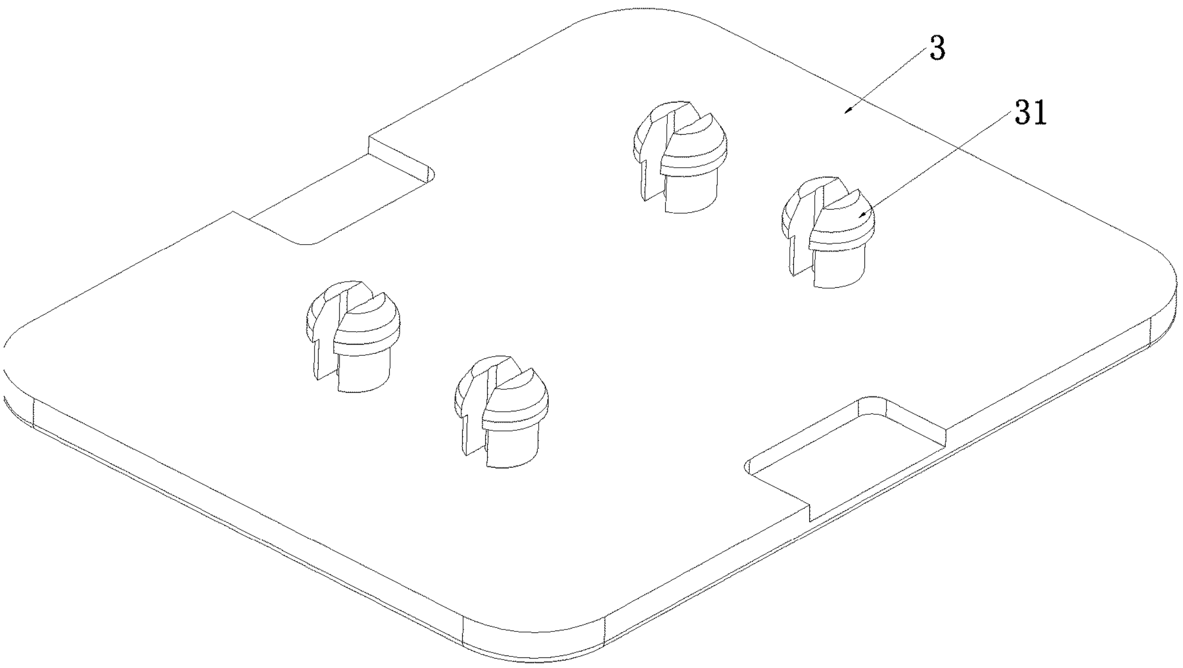
FIG. 12 is a schematic structural diagram of a connecting member according to the present application.

Referring to FIGS. 9-11, in an implementation, an end portion of the first end of the push cylinder 1321 is provided with a plurality of first avoidance grooves 13213, and the plurality of first avoidance grooves 13213 are sequentially provided around the axial central line of the push cylinder 1321. Each first avoidance groove 13213 is located between two adjacent second beveled portions 13211, and the first avoidance groove 13213 is configured to avoid a corresponding third beveled portion 13222 when the engaging member 133 rotates, so as to prevent the third beveled portion 13222 from interfering with the push cylinder 1321 during movement, such that the third beveled portion 13222 can move smoothly according to a set trajectory.

The peripheral wall of the first end of the rotating seat 1322 is provided with a plurality of second avoidance grooves 13223, and the plurality of second avoidance grooves 13223 are sequentially provided around an axial central line of the rotating seat 1322. Each second avoidance groove 13223 is located between two adjacent third beveled portions 13222, and the second avoidance groove 13223 is configured to avoid a corresponding second beveled portion 13211 when the engaging member 133 rotates, so as to prevent the rotating seat 1322 from interfering with the second beveled portion 13211 during movement, such that the rotating seat 1322 can move smoothly according to the set trajectory.

Referring to FIGS. 9-10, in an implementation, a plurality of guide blocks 13212 are arranged on a peripheral wall of the push cylinder 1321, and the plurality of guide blocks 13212 are arranged spaced apart from each other around the axial central line of the push cylinder 1321. The guide blocks 13212 are movably inserted into corresponding locking grooves 13111, and the second beveled portions 13211 are located on corresponding locking blocks 13221. With the arrangement of the guide blocks 13212, a contact area between the push cylinder 1321 and the locking groove 13111 can be increased, and the push cylinder 1321 can be guided reliably, so that the push cylinder 1321 moves more smoothly, thereby achieving a higher structural stability.

Figure 7:
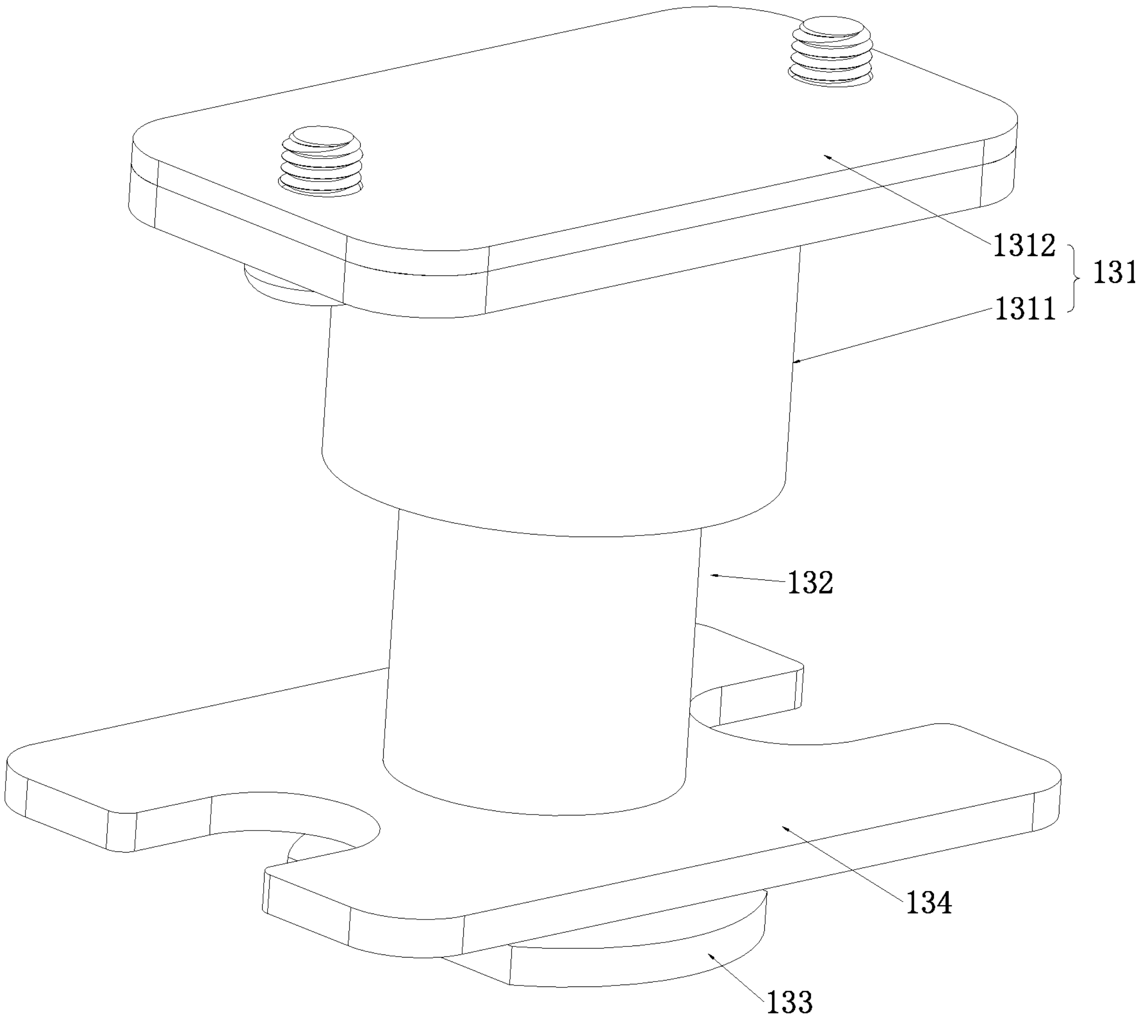
FIG. 7 is a schematic structural diagram of a connector according to the present application.

Referring to FIGS. 7-9, in an implementation, the connecting base 131 comprises: a connecting seat 1311 having a connecting hole 13112, and a limiting cover 1312. The connecting hole 13112 runs through the connecting seat 1311 vertically. The limiting cover 1312 covers the connecting seat 1311, the limiting cover 1312 covers an end of the connecting hole 13112 away from a bottom of the locking groove 13111, and the clastic member 1323 is located between the limiting cover 1312 and the rotating seat 1322. That is, the connecting base 131 is composed of the connecting seat 1311 and the limiting cover 1312 that are separately arranged. Therefore, during mounting, the rotating seat 1322 may be first inserted into the push cylinder 1321, then the push cylinder 1321 is inserted into the connecting hole 13112 from the end of the connecting hole 13112 away from the bottom of the locking groove 13111, and the second end of the push cylinder 1321 and the second end of the rotating seat 1322 both extend out from an end of the connecting hole 13112 close to the bottom of the locking groove 13111. Then, the elastic member 1323 is mounted to the first end of the rotating seat 1322 and is covered with the limiting cover 1312. Finally, the pressing member 134 and the engaging member 133 are sequentially mounted, so that the mounting can be completed, with low mounting difficulty and high mounting efficiency.

In an implementation, a third snap-fit structure 13114 is provided on the connecting seat 1311, a fourth snap-fit structure is provided on the limiting cover 1312, and the fourth snap-fit structure is connected to the third snap-fit structure 13114, such that the limiting cover 1312 and the connecting seat 1311 are connected together. That is, the limiting cover 1312 and the connecting seat 1311 are connected together in a snap-fit manner, thereby achieving simple disassembly and assembly operations and high disassembly and assembly efficiency.

Specifically, one of the third snap-fit structure 13114 and the fourth snap-fit structure is a hole, and the other is an engaging protrusion.

Referring to FIG. 8, in an implementation, the pressing member 134 is provided with a punched hole adapted to the push cylinder 1321 to snap-fit the pressing member 134 onto the push cylinder 1321.

Referring to FIG. 8, in an implementation, the engaging member 133 is fixed to the rotating seat 1322 by means of a fastener 135, such that the engaging member 133 and the rotating seat 1322 are reliably connected together.

Specifically, in an implementation, the elastic member 1323 is a spring. Of course, in other implementations, the elastic member 1323 may be of an elastic sheet structure.

In an implementation, the quickly-spliceable linear lamp further comprises a second light source 14, and the second light source 14 is arranged on a side of the housing body 11, such that the quickly-spliceable linear lamp is of a double light source structure.

In an implementation, the first light source 12 and the second light source 14 are respectively arranged on two opposite sides of the housing body 11.

In an implementation, the quickly-spliceable linear lamp further comprises a power source 15. The power source 15 is electrically connected to the first light source 12 and the second light source 14 to supply power to the first light source 12 and the second light source 14.

In the description of this description, descriptions with reference to the terms such as "an embodiment", "some embodiments", "example", "specific example", or "some examples" mean that specific features, structures, materials, or characteristics described in conjunction with the embodiment or example are included in at least one embodiment or example of the present application. Moreover, the specific features, structures, materials or characteristics described can be combined in any one or more embodiments or examples in any suitable manner. In addition, without any contradiction, those skilled in the art may bind and combine different embodiments or examples and features of the different embodiments or examples described in this description.

In addition, the terms "first" and "second" are used for descriptive purposes only, and cannot be construed as indicating or implying relative importance or implicitly indicating the number of technical features indicated. Thus, the features defined with "first" and "second" may explicitly or implicitly include at least one of the features. In the description of the present application, "a plurality of" means two or more, unless explicitly and specifically defined otherwise.

The above descriptions are merely specific implementations of the present application, but are not intended to limit the scope of protection of the present application. Any variation or replacement readily figured out by those skilled in the art within the technical scope disclosed in the present application shall fall within the scope of protection of the present application. Therefore, the scope of protection of the present application shall be subject to the scope of protection of the claims.

What is claimed is:

1. A quickly-spliceable linear lamp, comprising:

a lamp body;

two magnetic modules respectively arranged at two ends of the lamp body in a length direction thereof; and two positioning structures respectively arranged at the two ends of the lamp body in the length direction thereof, wherein when two quickly-spliceable linear lamps are spliced together, two magnetic modules between two adjacent ends of the two quickly-spliceable linear lamps magnetically cooperate with each other to connect the two quickly-spliceable linear lamps together, and two positioning structures between the two adjacent ends of the two quickly-spliceable linear lamps are connected together under the driving of magnetic attraction forces of the magnetic modules, such that the two adjacent ends of the two quickly-spliceable linear lamps are aligned with each other;

wherein the magnetic module comprises a connecting frame and a magnet, wherein the connecting frame is provided with a first connecting arm and a second connecting arm which are connected to each other, the first connecting arm is arranged in the lamp body and is connected to the lamp body, the second connecting arm is located on an end portion of the lamp body, and the magnet is arranged on the second connecting arm.

2. The quickly-spliceable linear lamp according to claim 1, wherein one of the magnetic modules has an S-pole magnet, and the other of the magnetic modules has an N-pole magnet.

3. The quickly-spliceable linear lamp according to claim 1, wherein in each magnetic module, there are at least two magnets arranged spaced apart from each other.

4. The quickly-spliceable linear lamp according to claim 1, wherein the positioning structure comprises a positioning groove and a positioning block, wherein the positioning groove and the positioning block are respectively arranged on two sides of the lamp body in a width direction thereof; and when the two quickly-spliceable linear lamps are spliced together, the positioning grooves and the positioning blocks located on the different quickly-spliceable linear lamps cooperate with each other.

5. The quickly-spliceable linear lamp according to claim 4, wherein the positioning block and the connecting frame are integrally formed, the positioning block is located on a first side of the connecting frame in a width direction thereof, and a second side of the connecting frame in the width direction thereof and an inner wall of the lamp body enclose the positioning groove.

6. The quickly-spliceable linear lamp according to claim 1, wherein the positioning structure comprises a positioning groove and a positioning block, wherein the positioning groove and the positioning block are respectively arranged on two sides of the lamp body in a width direction thereof; and when the two quickly-spliceable linear lamps are spliced together, the positioning grooves and the positioning blocks located on the different quickly-spliceable linear lamps cooperate with each other.

7. The quickly-spliceable linear lamp according to claim 1, further comprising a connecting member, wherein two first snap-fit structures are provided on the connecting member, and the two first snap-fit structures are sequentially arranged in a length direction of the connecting member;

side walls of the two ends of the lamp body each are provided with a second snap-fit structure; and when the two quickly-spliceable linear lamps are spliced together, one of the first snap-fit structures is snap-fitted with the second snap-fit structure on one of the quickly-spliceable linear lamps, and the other first snap-fit structure is snap-fitted with the second snap-fit structure on the other quickly-spliceable linear lamp, so as to limit separation of the two adjacent magnetic modules from each other.

8. The quickly-spliceable linear lamp according to claim 1, further comprising two end caps, wherein the two end caps are respectively removably arranged at the two ends of the lamp body to close end portions of the lamp body.

9. The quickly-spliceable linear lamp according to claim 1, wherein the lamp body comprises:

a housing body;

a first light source having an engaging groove; and a connector comprising a connecting base, a press-type driving structure, and an engaging member, wherein the connecting base is connected to the housing body, the press-type driving structure is movably arranged on the connecting base, the engaging member is connected to the press-type driving structure, and the engaging member has a connected state in which the engaging member is connected to the engaging groove and an unlocked state in which the engaging member is disconnected from the engaging groove;

the first light source and the housing body are connected together when the engaging member is connected to the engaging groove, or the first light source is disconnected from the housing body when the engaging member is disconnected from the engaging groove; and the press-type driving structure is capable of being pressed by the first light source to move so as to drive the engaging member to rotate, and the engaging member rotates to switch between the connected state and the unlocked state.

* * * * *